3,046,609
PROCESS FOR DRYING THERMOPLASTIC MATERIALS

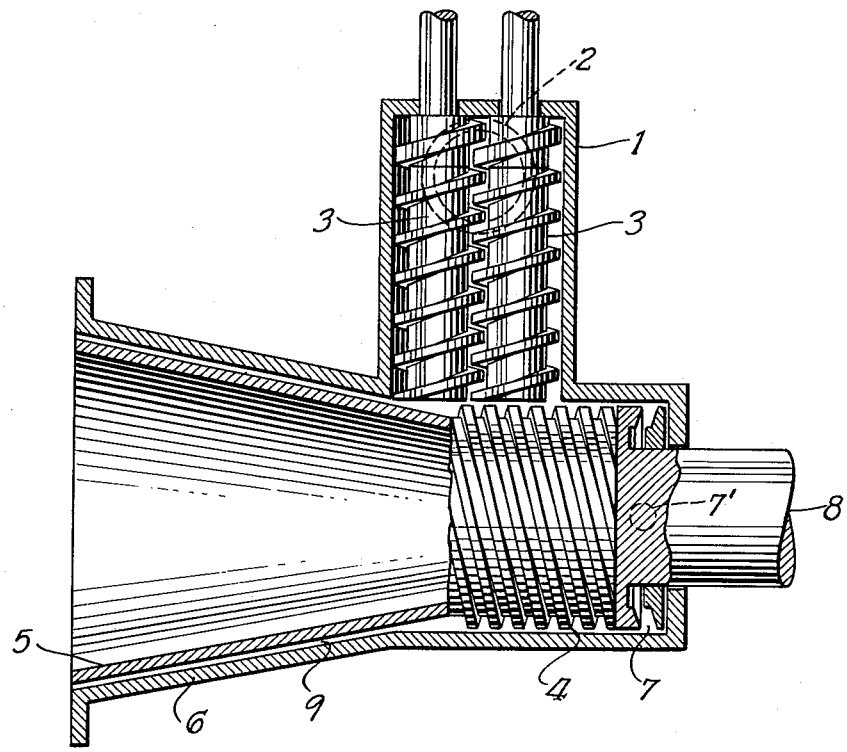

Eduard Bergmeister, Joseph Heckmaier, and Martin Doriat, all of Burghausen, Upper Bavaria, Germany, assignors to Wacker-Chemie G.m.b.H., Munich, Germany, a firm of Germany
Filed Nov. 27, 1959, Ser. No. 855,746
Claims priority, application Germany Oct. 26, 1955
2 Claims. (Cl. 18—48)

The principal object of the present invention is to provide a method for the removal of liquids such as water, for example, from either wet or damp thermoplastic materials or for the drying of solid substances which are obtained in the form of either wet or damp powders or granules, employing suitable apparatus in which the bulk of the water is removed without either the application of centrifugal force or filtration and in which the materials are dried without the application of external heat.

Wet or moist substances are commonly dried by the application of heat to these substances so that the water on the surfaces of the substances or trapped in the body of the substances is vaporized. The drying of certain materials in a commercially practical manner is frequently attended to by considerable difficulty which may be due to the physical form of the material, the poor heat conductivity, the thermal sensitivity of the material being dried, or to a low rate of diffusion of the liquid being vaporized, or to other causes. The rather poor heat conductivity of many materials especially plastic substances which are frequently quite sensitive to heat as well ordinarily requires the use of expensive drying apparatus since high energy consumption is generally involved. In the case of powdered or granular materials a substantial proportion of the moisture content is found within the individual particles so that the drying rate depends predominantly on the rate of diffusion which, as is well known, is generally quite low. These difficulties are most commonly encountered with conventional drying devices when they are employed for the drying of thermoplastic materials which reach or approach their softening point at a temperature close to that of the temperature of vaporization of the liquid, which in the case of polyvinylacetate differs by only about 30° C.

A process for the continuous drying of these thermoplastic substances has now been found which permits the drying of these substances in a simple and commercially practical manner and especially those thermoplastic substances which are commonly obtained by suspension polymerization methods. Thus, for example, in the bead or pearl polymerization of substances such as vinyl acetate an aqueous suspension of polyvinyl acetate particles is obtained which contains about 40% to 60% by weight of bead-shaped or lenticular particles of a particle size of up to 6 mm. in their maximum dimension with the remainder of the suspension comprising about 60% to 40% by weight of water. In accordance with the novel process of this invention, the water is removed from this aqueous suspension or dispersion and the polymer remaining is then dried in a three-stage process employing apparatus which is hereinafter described in greater detail.

In the initial stage of this process, the aqueous dispersion or suspension is fed to a suitable chamber adjacent to or superimposed on the actual drying means to which it is fed by the action of a screw conveyor in the form of a pair of helices which mesh as they rotate. Because of the degree of compression built up by the rotation of the helices, the solid phase is retained and the greater portion of the water is forced out and is discharged in a direction backward or countercurrent to the flow or movement of the solid phase. In this manner the initial stage effects a concentration of the suspension to a solids content of from 70% to 80% by weight.

The second stage comprises exerting further pressure on the solids remaining by means of an auxiliary or secondary or helical screw conveyor. Most advantageously, the helix is designed to operate in a cylindrical housing at a variable speed. The suspension of 70% to 80% solids content is fed to the auxiliary screw conveyor or helix by the first stage screw conveyor at a right angle to the axis of rotation of the auxiliary screw conveyor or helix. The auxiliary helix carries the suspension forward and forces it into the space or gap in which the actual drying operation is effected, as described below, which constitutes the third stage of the instant process. As a result of the pressure exerted on the material a circular plug of more or less plastic and compacted material is formed in the initial portion of the work space or gap which is provided and this plug effectively acts to block the flow of any water remaining in the material from moving in the direction of this working space. Any water present is thereby discharged at the opposite end of the auxiliary screw conveyor which is provided with a suitable discharge port in the housing through which the water can conveniently leave.

This initially compacted material which now contains but 5% to 10% by weight of water is now introduced into the third stage of the process which is carried out by means of a suitable apparatus incorporating an annular and conically shaped work space or gap, as described below, in which the actual drying step is carried out. In the initial portion of this work space or gap the plug of compacted and somewhat plastic material as described above undergoes a tearing or shredding action because of the gradual increase in the cross-sectional diameter of the annular space. The result of this reduces the plastic material to the form of strings since the material is subjected to a rolling action because of the relative movement of the working surfaces between which it is being processed. These strings of plastic material are very similar in appearance and form to the rolls which go to form the usual roller bearings. One important difference, however, is that the strings thus formed because they are plastic in nature undergo a certain degree of deformation and instead of being perfectly round are actually oval in cross-section as they are being processed. The work done on the normally highly viscous plastic material generates a substantial amount of heat within the material because of the internal frictional stresses created with the result that the relatively small amount of water remaining is raised to a temperature above its boiling point and is vaporized. By reason of the rolling motion the material at the surface of each of the strands is continuously changing and the vaporization of the liquid contained in the material is greatly accelerated. Employing this process with polyvinyacetate, for example, a temperature of 150° C. to 200° C. is reached within a very short time without the use of external heat with the result that the water present is vaporized very rapidly, ordinarily in from 0.5 to 2 minutes. Since the working space or gap in the apparatus employed is only partly filled with the material being processed, and usually is only half full, the steam generated by the vaporization of the water present can escape very readily through the intermediate spaces in the direction of movement of the plastic strings or strands. In addition, because of the relatively high temperature at which the thus dried material is discharged from the work space, the possibility of any condensation of the vapors on the material being discharged is avoided.

The product which is thus obtained may be processed in a variety of ways. It can be converted to granules in granulating apparatus connected directly to the drying device and the granules can then be air-cooled, preferably with dry air; it can be forced through a strand press, the strands cooled and then reduced into particle size; also the product while still warm can be introduced into suitable apparatus such as a screw fed injection press where it can be combined with a solvent so that very rapid solution may be effected because of the finely-divided form of the plastic material.

In carrying out the process of the present invention, apparatus which is particularly suitable is that which contains a gap or working space of the type described which is annular in shape and in the form of a truncated cone in which the cross-sectional diameter of the annular space increases toward the discharge end. Such processing equipment is available and is found in those devices provided with conical rolls contained within a conical housing. Especially suitable is the type of equipment utilized for plasticizing thermoplastic materials to produce homogeneous masses such as those disclosed and described in German Patent No. 914,551 and in United States Patents Nos. 2,763,896 and 2,779,054 in which a rotatable conically shaped body rotates in a surrounding casing which provides a narrow clearance between the body and the outside casing, so that an annular space or gap remains, and in which the material being processed is discharged from the expanding end after moving in a direction along the axis of rotation of the inner conically shaped body. Other variations which are suitable will occur to those skilled in the art.

Proportioning or metering devices which produce high operating pressures are suitable for carrying the suspensions to the work space and various types of screw conveyor worms or helices, single or double, are preferably employed. It is only essential that the work space utilized has but a limited width in cross-section and be provided with suitable openings so that the water which is forced out of the suspension by the pressure created can be discharged. By roughening the surface of the work space by either sand-blasting or by providing ribs, the rolling action obtained may be greatly enhanced.

In the attached drawing, there is shown a form of apparatus for carrying out the novel process of this invention which has been shown to be highly efficient and effective. In the drawing, the FIGURE is a vertical view, partly in section, of this device. This device comprises an outer sleeve or shell 1 provided with a lateral opening 2 into which the suspension to be dried is introduced from a suitable storage vessel (not shown). The suspension passing into opening 2 is fed to a pair of meshing, suitably rotated feed screws 3 which cooperate to put the mass under high pressure and to force the major part of the water out. The water pressed out of the material being fed by the screws 3 passes rearwardly through opening 2 countercurrently to the flow of the suspension. Mixing may be avoided by intermittent feed or by providing separate but coaxially aligned feed and discharge ports. If necessary, suitable screening may be utilized to prevent backflow of the solid material being fed. The rotation of the feed screws 3 forces the material to be dried downwardly into the path of a screw conveyor 4 driven by a shaft 8. The conveyor 4 is integral with a flared rotor 5 rotating within a flared sleeve 6 which forms a part of the shell 1 of said device. The action of the screw conveyor 4 subjects the material being dried to further pressure which squeezes the bulk of the liquid out of the material as it is forced forward, the liquid passing backward into an annular space 7 from which it then escapes outwardly through an orifice 7' provided in the shell 1 adjacent to the drive shaft 8. The action of screw conveyor 4 compacts the material being dried and produces a plug of partially plastified material in the portion of a clearance or work space 9 between the sleeve 6 and the rotor 5 immediately adjacent to the discharge end of the screw conveyor 4 thus preventing any water present from entering said work space as described above. In view of the flaring of the work space or gap 9 in an outward direction the partially plastified material is worked into elongated strands by the relative movement of the internal surfaces as the rotor 5 rotates. The surfaces of the material are constantly altered by this rolling movement and the frictional component of this motion produces a substantial amount of heat which acts to vaporize the water present and to maintain the material in a satisfactorily plastic state. The dried strands are discharged from the open end of the flared work space or gap 9.

For maximum efficiency and effect the conditions under which the device is operated should be adiabatic so far as possible with heat neither being added nor removed. While heat may be added through suitable jacket means through which a heating medium is passed or by use of electrical resistance coils, the heat introduced should merely be that necessary to compensate for the heat losses. The frictional component may be increased by the use of internal ribs which may be 2 to 3 mm. in width where materials of higher viscosity are being processed, or 0.3 to 1.5 mm. in width in the case of materials of lower viscosity. The degree of frictional heat developed can also be varied by varying the speed of rotation of the rotor 5 as well as the speed of rotation of the feed screws 3. The rotational speed of the rotor need not be too high since excessive speed will produce much more heat than is desired with the danger of charring the material being treated. Highly satisfactory results have been obtained with the rotor being operated at from 15 to 40 r.p.m., preferably about 30 r.p.m. with a peripheral surface velocity of 3 to 24 meters per minute where the annular work space or gap 9 is of a lesser diameter and a peripheral surface velocity of 15 to 40 meters per minute at the increased diameter approaching the discharge end. The space between the work surfaces is ordinarily of the order of 1.0 to 10 mm.

It is extremely important that in the greater portion of the work space or gap the force exerted on the material be essentially a rolling force with little or no sliding friction since the latter produces an excess of heat, with the result that charring of the product may take place. In addition, where the frictional forces are essentially sliding little or no opportunity is provided for the vapors formed to escape. The desired rolling action is achieved through the proper design and surface characteristics of the work space or gap 9 with the type of surface achieved by sandblasting being highly effective. The desired action is also achieved by the use of ribbed surfaces with the apparatus disclosed in the United States Patent No. 2,779,054 being highly effective.

In order further to illustrate this invention, the following examples are given:

*Example 1*

A 50% by weight aqueous dispersion of a pearl polymerizate obtained from polyvinyl acetate is introduced into a device of the type disclosed in German Patent No. 914,551 having a double screw conveyor to force the material to be dried into the work space or gap. With the application of additional pressure the water content of the initially compacted material is reduced from about 20% by weight in the first stage to at most 10% by weight in the second stage when it is finally forced into the work space or gap for the third stage. The rotating motion of the conical flared rotor carries the material toward the discharge end. The polyvinyl acetate material is initially converted to a somewhat plastified condition by the action of the heat and pressure so that the initial motion in the working space or gap is a sliding action which is, however, altered as the material is broken apart and is rapidly formed into strings or strands which are then subjected to rolling motion as a result of the relative movement of the surfaces as the rotor rotates. The heat generated by this movement causes the water remaining to be converted to vapor which escapes, thus leaving the material being dried in the form of strands and substantially in a dry state. The temperature of the material being processed reaches about 125° C. to 150° C. and the drying operation is completed in about one to three minutes, the product obtained being dried strands of polyvinyl acetate which can be readily granulated if fed to a suitable converter.

In the process described above, both polyvinyl chloride and polyvinyl alcohol dispersions may be converted to dried materials in the same way.

*Example 2*

Moist polyvinyl chloride powder with a water content of 40 weight percent is introduced into the apparatus described in Example 1. Initially water is pressed out; as the material advances through the work space or gap heat is developed within the material which causes evaporating of the residual water. The steam escaping from the apparatus carries along the polyvinyl chloride in the form of a powder. It is possible to control the process so that the production of heat by pressure and friction is so great that the powder leaving the apparatus is completely dry. If the friction is further increased plasticization can be effected simultaneously with the production of strands.

*Example 3*

A dispersion of polyvinyl alcohol in a mixture of methanol and ethylacetate containing 40% polyvinyl alcohol was treated according to Example 1. The developed heat evaporated the solvent mixture, the polyvinyl alcohol being obtained in pulverized form and having a moisture content of 2%.

This application is a continuation-in-part of our copending application Serial No. 654,050, filed October 24, 1956.

We claim:

1. In a process for removing the water from and drying a dispersion of polyvinyl acetate in water, the steps which comprise removing the major part of the water present in the aqueous polyvinyl acetate dispersion by exerting a pressure on said dispersion to force the water out so that the water content is reduced to a maximum of about 10% by weight, passing the resulting moist polyvinyl acetate under shearing mechanical force through a narrow annular work space in which the surfaces forming the work space have a rotational movement relative to each other and in which the diameter of said annular work space increases and flares outwardly in the direction of movement of said polyvinyl acetate, converting the polyvinyl acetate by the shearing mechanical force while in said work space into a plurality of strands, imparting a rotational motion to said strands by the relative movement of the surfaces forming the work space while subjecting said strands to compression so that the frictional component of the shearing mechanical force is converted to heat energy thereby raising said polyvinyl acetate strands to a temperature above the boiling point of water and in the range of from 125° C. to 200° C., maintaining said polyvinyl acetate strands at said temperature and subject to said force and rotational motion for a period of from 0.5 to 2 minutes while passing through said outwardly flaring annular work space thereby to permit the heat energy produced to vaporize off substantially all of the water in said polyvinyl acetate, removing said water vapor and discharging the polyvinyl acetate from said narrow annular work space in the form of strands of substantially dry polyvinyl acetate material.

2. Process in accordance with claim 1 in which the surfaces forming said annular work space are roughened by sand-blasting.

References Cited in the file of this patent

UNITED STATES PATENTS

| | | |
|---|---|---|
| 2,177,612 | Schabell | Oct. 24, 1939 |
| 2,371,722 | Wanderer | Mar. 20, 1945 |
| 2,763,896 | Vogt | Sept. 25, 1956 |
| 2,780,834 | Bernhardt | Feb. 12, 1957 |
| 2,810,159 | Teichmann | Oct. 22, 1957 |
| 2,833,750 | Vickers | May 6, 1958 |